United States Patent
Reuche

(10) Patent No.: US 12,137,473 B2
(45) Date of Patent: Nov. 5, 2024

(54) METHOD FOR CONFIGURING A PLURALITY OF WIRELESS ACCESS POINT DEVICES AND ASSOCIATED CONFIGURATION DEVICE

(71) Applicant: SAGEMCOM BROADBAND SAS, Rueil Malmaison (FR)

(72) Inventor: Anthony Reuche, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 175 days.

(21) Appl. No.: 17/558,751

(22) Filed: Dec. 22, 2021

(65) Prior Publication Data

US 2022/0201708 A1 Jun. 23, 2022

(30) Foreign Application Priority Data

Dec. 23, 2020 (FR) ........................ 2014071

(51) Int. Cl.
*H04W 4/00* (2018.01)
*H04W 72/50* (2023.01)

(52) U.S. Cl.
CPC ................. *H04W 72/535* (2023.01)

(58) Field of Classification Search
CPC ... H04W 72/535; H04W 24/02; H04W 16/18; H04W 16/20; H04W 28/04; H04W 72/04;
(Continued)

(56) References Cited

U.S. PATENT DOCUMENTS

2005/0059406 A1 3/2005 Thomson et al.
2006/0104231 A1* 5/2006 Gidwani ............... H04W 84/00
370/328

(Continued)

FOREIGN PATENT DOCUMENTS

| CN | 2118320 U | * 10/1992 | ............. G04C 21/30 |
| WO | 2005/029277 A2 | 3/2005 | |
| WO | 2015/042773 A1 | 4/2015 | |

OTHER PUBLICATIONS

CN 2118320 U, Fu-xing Fang, English Machine Translation, pp. 1-4 (Year: 1992).*

(Continued)

*Primary Examiner* — Phuongchau Ba Nguyen
(74) *Attorney, Agent, or Firm* — Williams Mullen; R. Brian Drozd

(57) ABSTRACT

A method for configuring a plurality of wireless access point devices, executed by a configuration device, in a communication network, includes: gathering first information items representing usage capacities of the wireless access point devices; gathering second information items representing the use or usage capacities of electronic devices connected to one or more wireless access point devices; gathering third information items representing a use, by at least one wireless access point device outside the network, of a communication channel that can be used by at least one wireless access point device; considering a plurality of configuration scenarios corresponding to a combination of a frequency band and a bandwidth; establishing a theoretical performance score for each of the scenarios, the score established at least with respect to said first, second and third information items and configuring the wireless access point devices in accordance with the configuration scenario having the best performance score.

9 Claims, 9 Drawing Sheets

(58) Field of Classification Search
CPC ... H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS

| | | | | |
|---|---|---|---|---|
| 2015/0092573 | A1* | 4/2015 | Zhang | H04W 72/56 370/252 |
| 2016/0036618 | A1* | 2/2016 | Einhaus | H04L 1/0016 370/329 |
| 2016/0135172 | A1* | 5/2016 | Sun | H04W 72/21 370/329 |
| 2016/0156673 | A1* | 6/2016 | Emmanuel | H04W 4/38 370/338 |
| 2016/0309345 | A1* | 10/2016 | Tehrani | H04W 28/0861 |
| 2019/0320494 | A1* | 10/2019 | Jayawardene | H04L 43/10 |
| 2022/0201708 | A1* | 6/2022 | Reuche | H04W 16/20 |
| 2023/0209370 | A1* | 6/2023 | Pateromichelakis | G06N 20/00 370/328 |
| 2023/0337043 | A1* | 10/2023 | Pateromichelakis | H04W 28/0263 |

OTHER PUBLICATIONS

Sep. 9, 2021 Search Report issued in French Patent Application No. 2014071.

* cited by examiner

CT

| CHAN | CHAN CHANNEL | CHAN BAND | CHAN 80MHz | CHAN 160MHz | CHAN 40MHz | CHAN PREFERENCE | CHAN OCCUPATION |
|---|---|---|---|---|---|---|---|
| 1 | 36 | 1 | 1 | 1 | 1 | 8 | 1+1=2 |
| 2 | 40 | 1 | 1 | 1 | 1 | 4 | 10+10=20 |
| 3 | 44 | 1 | 1 | 1 | 2 | 6 | 10+10=20 |
| 4 | 48 | 1 | 1 | 1 | 2 | 2 | 10+10=20 |
| 5 | 52 | 2a | 1 | 2 | 3 | 3 | 10 |
| 6 | 56 | 2a | 1 | 2 | 3 | 7 | 10 |
| 7 | 60 | 2a | 1 | 2 | 4 | 1 | 10 |
| 8 | 64 | 2a | 2 | 3 | 4 | 5 | 10 |
| 9 | 100 | 2c | 2 | 3 | 5 | 4 | 10 |
| 10 | 104 | 2c | 2 | 3 | 5 | 8 | 1 |
| 11 | 108 | 2c | 2 | 3 | 6 | 6 | 10 |
| 12 | 112 | 2c | 2 | 4 | 6 | 2 | 10 |
| 13 | 116 | 2c | 2 | 4 | 7 | 5 | 0 |
| 14 | 120 | 2c | 2 | 4 | 7 | 3 | 0 |
| 15 | 124 | 2c | 2 | 4 | 8 | 7 | 0 |
| 16 | 128 | 2c | 2 | 5 | 8 | 1 | 0 |
| 17 | 132 | 2c | 0 | 5 | 9 | 3 | 0 |
| 18 | 136 | 2c | 0 | 5 | 9 | 4 | 0 |
| 19 | 140 | 2c | 0 | 5 | A | 2 | 0 |
| 20 | 144 | 2c | 0 | 6 | A | 1 | 0 |
| 21 | 149 | 3 | 0 | 6 | B | 4 | 0 |
| 22 | 153 | 3 | 0 | 6 | B | 2 | 0 |
| 23 | 157 | 3 | 0 | 6 | C | 1 | 1 |
| 24 | 161 | 3 | 0 | 6 | C | 3 | 10 |

Fig. 9

METHOD FOR CONFIGURING A PLURALITY OF WIRELESS ACCESS POINT DEVICES AND ASSOCIATED CONFIGURATION DEVICE

TECHNICAL FIELD

The present invention relates to communication networks providing electronic devices with wireless connections via wireless access point devices. The present invention more specifically relates to the configuration of a plurality of wireless access point devices of the same network.

PRIOR ART

Wireless communications have developed significantly and most electronic devices are currently connected to a network, or are interconnected, by means of wireless access point type devices. The density of wireless access point devices can be high in a given network or for a determined geographical area. This is often the case, for example, in residential areas. Numerous wireless access point devices, neighbouring each other, often operate in the same frequency bands, even using the same communication channels, which by nature substantially reduces the performance capabilities of the communications established by these devices. Furthermore, recent wireless access point devices can operate in different frequency bandwidths for one communication channel, such as 20 MHz, 40 MHz, 80 MHz or 160 MHz, for example. This also possibly affects the performance capabilities of the communications that are established. The situation can be improved.

DISCLOSURE OF THE INVENTION

The aim of the invention is to propose a shared and improved method for configuring a set of wireless access point devices of a communication network, with the method particularly comprising a detailed analysis of all the radio resources and the rearrangement of these resources.

To this end, a method is proposed for configuring a plurality of wireless access point devices, executed by a configuration device, in a communication network, the method comprising:
  gathering first information items representing usage capacities of the wireless access point devices;
  gathering second information items representing the use or the usage capacities of electronic devices connected to one or more of the wireless access point devices;
  gathering third information items representing a use, by at least one wireless access point device outside the communication network, of a communication channel that can be used by at least one of the wireless access point devices;
  considering a plurality of configuration scenarios, with each of the configuration scenarios corresponding to a selection, for each of the wireless access point devices, of a combination of a frequency band and of a frequency bandwidth;
  establishing a theoretical performance score for each of said considered configuration scenarios, with the score being established at least with respect to said first, second and third information items; and
  configuring the wireless access point devices of the plurality of wireless access point devices in accordance with the configuration scenario having the best performance score.

The method according to the invention can also comprise the following features, taken individually or in combination:
  The method for configuring the plurality of wireless access point devices further comprises:
  determining, for each of the wireless access point devices of the plurality of wireless access point devices, one or more intermediate indicators on the basis of all or some of the first, second and third gathered information items, and wherein establishing a theoretical performance score for each of said considered configuration scenarios takes into account at least one intermediate indicator.
  The one or more first intermediate indicators are included in the following list: a communication channel preference index, a communication channel occupancy rate, a priority index of the use of a wireless access point device.
  The step intending to consider a plurality of scenarios involves selecting a communication channel, which selection of a communication channel involves selecting a primary communication channel having the highest preference index from among a plurality of channels having the lowest occupancy rate.
  A theoretical occupancy rate is defined using different weightings whereby two access point devices within range of each other may or may not share the same primary communication channel.

The invention also relates to a device for configuring a plurality of wireless access point devices, in a communication network, the configuration device comprising:
  a module for gathering first information items representing usage capacities of the wireless access point devices;
  a module for gathering second information items representing the use or the usage capacities of electronic devices connected to one or more of the wireless access point devices;
  a module for gathering third information items representing a use, by at least one wireless access point device outside the communication network, of a communication channel that can be used by at least one of the wireless access point devices;
  a module for comparing a plurality of configuration scenarios, with each of the configuration scenarios corresponding to a selection, for each of the wireless access point devices, of a combination of a frequency band and of a frequency bandwidth; and for
  establishing a theoretical performance score for each of said considered configuration scenarios, with the score being established at least with respect to said first, second and third information items; and
  a module for configuring the wireless access point devices of the plurality of wireless access point devices in accordance with the configuration scenario having the best performance score.

The invention also relates to network gateway type communication equipment or a remote server, of the "cloud" server type comprising a configuration device as previously described.

Finally, the aim of the invention is a computer program product comprising program code instructions for executing the steps of the aforementioned method, when the program is executed by a processor, as well as a support device for storing information comprising such a computer program product.

Advantageously, the computer program product implements a method that comprises a path index of a plurality of scenarios, which index uses hexadecimal coding of a number of traversed communication channels.

BRIEF DESCRIPTION OF THE DRAWINGS

The features of the invention that are mentioned above, as well as other features, will become more clearly apparent from reading the following description of at least one embodiment, with said description being provided with reference to the accompanying drawings, in which:

FIG. 9 is an example of a comparison table for theoretical occupancy rates of channels for assessing a configuration scenario for wireless access point devices.

DETAILED DISCLOSER OF EMBODIMENTS

Figure 1:
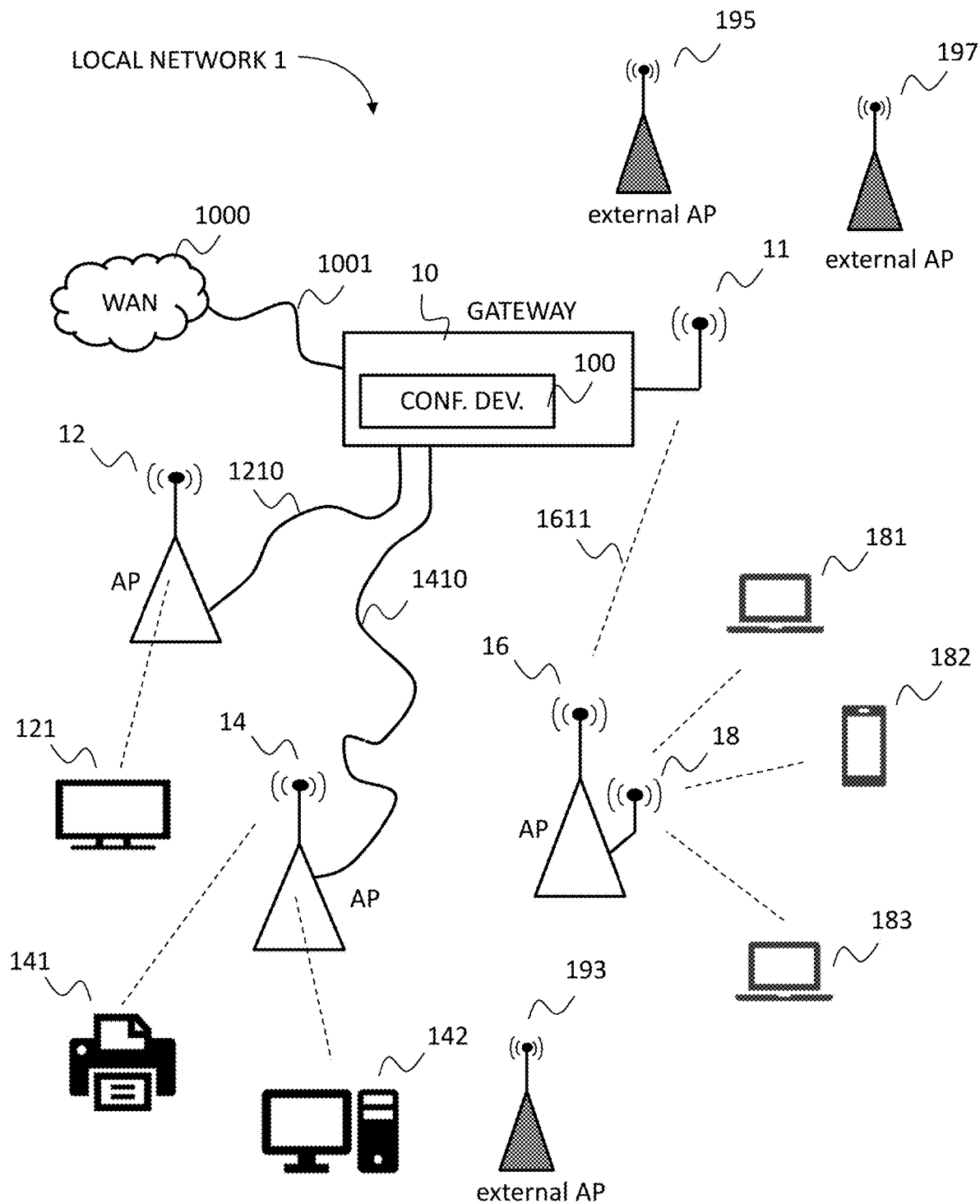
FIG. 1 schematically shows a communication network, in which a method for configuring a plurality of wireless access point devices is implemented, according to one embodiment of the invention.

FIG. 1 schematically shows a local communication network 1. The local network 1 is, for example, a domestic local network that comprises network gateway equipment 10, typically of the residential network gateway type. The network gateway 10 is configured to connect the local network 1 to a wide area network 1000, by means of a connection link 1001. The wide area network 1000 is a WAN type network. According to one embodiment of the invention, the wide area network 1000 is the Internet. The connection link 1001 can be implemented in the form of a telephone subscriber line, and the connection uses, for example, ADSL (Asymmetric Digital Subscriber Line) technology, a fibre optic type connection or even a fixed wireless access type link based on 4G and/or 5G access technologies, for example. These examples are not limiting. Various types of electronic devices 121, 141, 142, 181, 182 and 183 are configured to be connected to the local network 1 by means of the network gateway 10. Thus, the electronic device 121, of the high-definition television type, is connected to the network gateway 10 via a wireless access point device 12, which is connected to the network gateway 10 via a wired connection 1210. The electronic device 141 is a printer, a data and control link of which is connected to the local network 1 by means of a wireless access point device 14, which is connected to the network gateway 10 via a wired link 1410. The wired links 1210 and 1410 are, for example, of the Ethernet type. An electronic device 142, of the fixed computer type, is also connected to the network gateway 10 by means of the wireless access point device 14. The electronic devices 181, 182 and 183, respectively of the laptop, smartphone and notebook type, are wirelessly connected to a wireless access point device 18, which in turn is connected to a wireless access point device 16 establishing a wireless connection 1611 with the network gateway 10. The wireless connection 1611 between the wireless access point 16 and the network gateway 10 is made by means of a wireless access point device 11 embedded in the network gateway 10. The connection between the wireless access point devices 16 and 18 is an internal wired link. Indeed, the wireless access point devices 16 and 18 are included in the same single piece of Wi-Fi wireless repeater type equipment. According to one embodiment, all the devices shown are configured or can be configured to establish wireless communications according to an IEEE 802.11 (a, b, g, n, ac, ax) standard or any of the amendments thereto. The wireless access point device 11 of the network gateway 10 is connected to an internal communication module 115 of the network gateway 10 configured for wired and wireless connections (not shown in FIG. 1, but visible in FIG. 5). The communication module 115 also controls the internal wired interfaces of the network gateway 10, and therefore partly the wired connections 1210 and 1410.

The term "wireless access point device" is to be understood in the present description as referring to a radio communication interface, commonly called radio.

The network gateway 10 further comprises a configuration device 100 configured to establish a remote configuration of all the wireless access point devices of the local network 1, namely wireless access point devices 11, 12, 14, 16 and 18.

Other wireless access point devices 193, 195 and 197 are present in the geographical and electromagnetic (or radio) environment of the local network 1 and therefore can potentially each use common configurations with one or more of the wireless access point devices 11, 12, 14, 16 and 18.

Advantageously, the configuration device 100 is adapted to analyze, at regular intervals and upon the request of an administrator or a user, or even according to a predefined policy, all the wireless access point devices of the local network 1, in terms of operation and of the electromagnetic environment, and to gather information representing these elements with a view to subsequently establishing an overall reconfiguration. Ingeniously, a step of assessing a plurality of configuration scenarios is carried out, in which step a score is allocated to each of the scenarios as a function of predetermined criteria. According to one embodiment of the invention, all possible scenarios are considered. According to an alternative embodiment of the invention, only scenarios of significant interest in terms of performance are considered in order to limit the computation operations.

Figure 2:
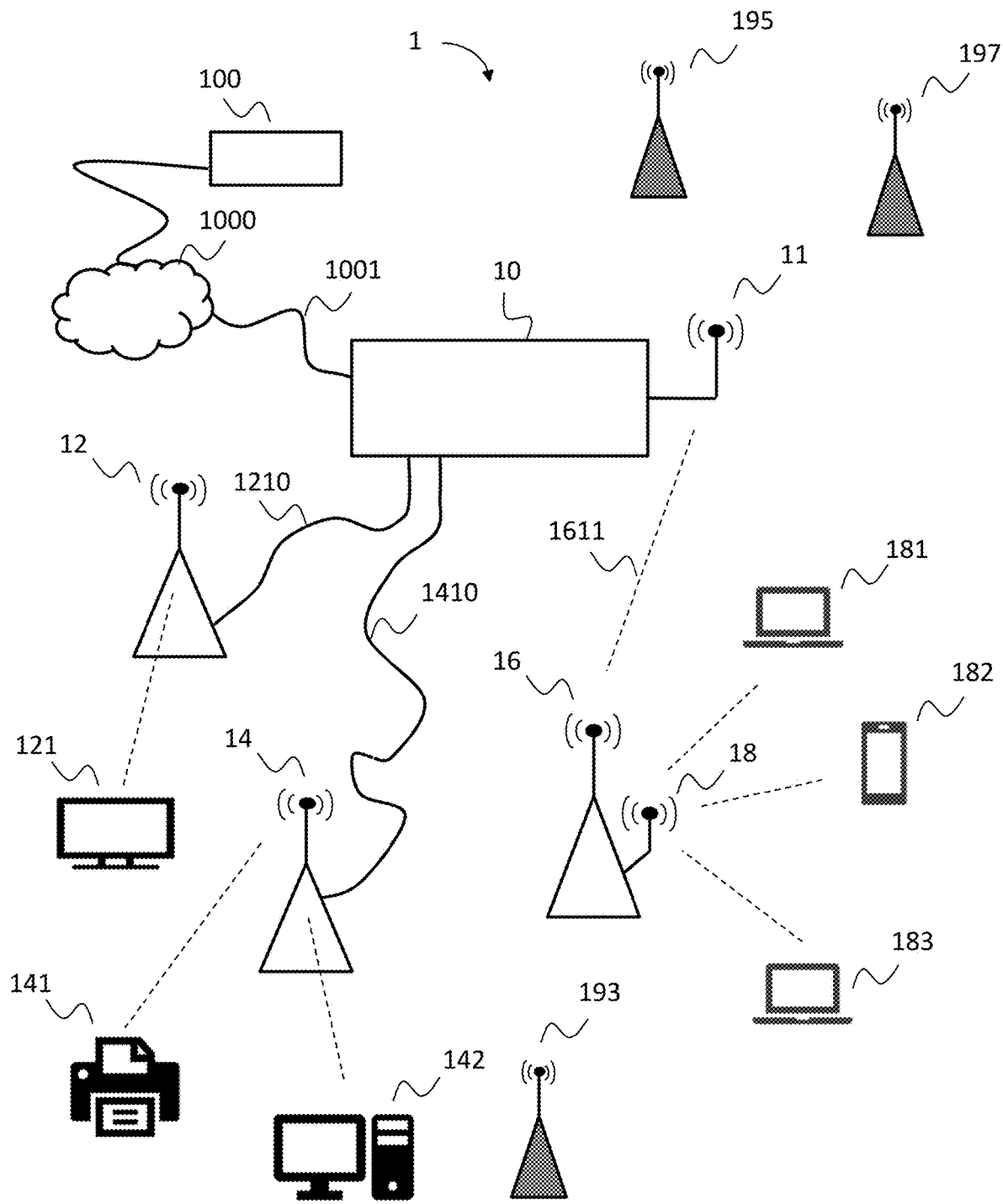
FIG. 2 schematically shows an alternative embodiment of the implementation of the communication network already shown in FIG. 1.

FIG. 2 shows an alternative embodiment of the implementation of the local network 1 connected to the wide area network 1000, according to which the configuration device 100 adapted for the remote configuration of all or some of the wireless access point devices 11, 12, 14, 16 and 18 is implemented in the wide area network 1000, providing a solution called "Cloud" solution. According to this alternative embodiment, the configuration device 100 can be configured to establish, in addition to a reconfiguration of the wireless access point devices of the local network 1, a configuration of wireless access point devices included in a plurality of local networks similar to the local network 1 and interconnected to the wide area network 1000 by means of network gateway type equipment similar to the network gateway 10.

Figure 3:
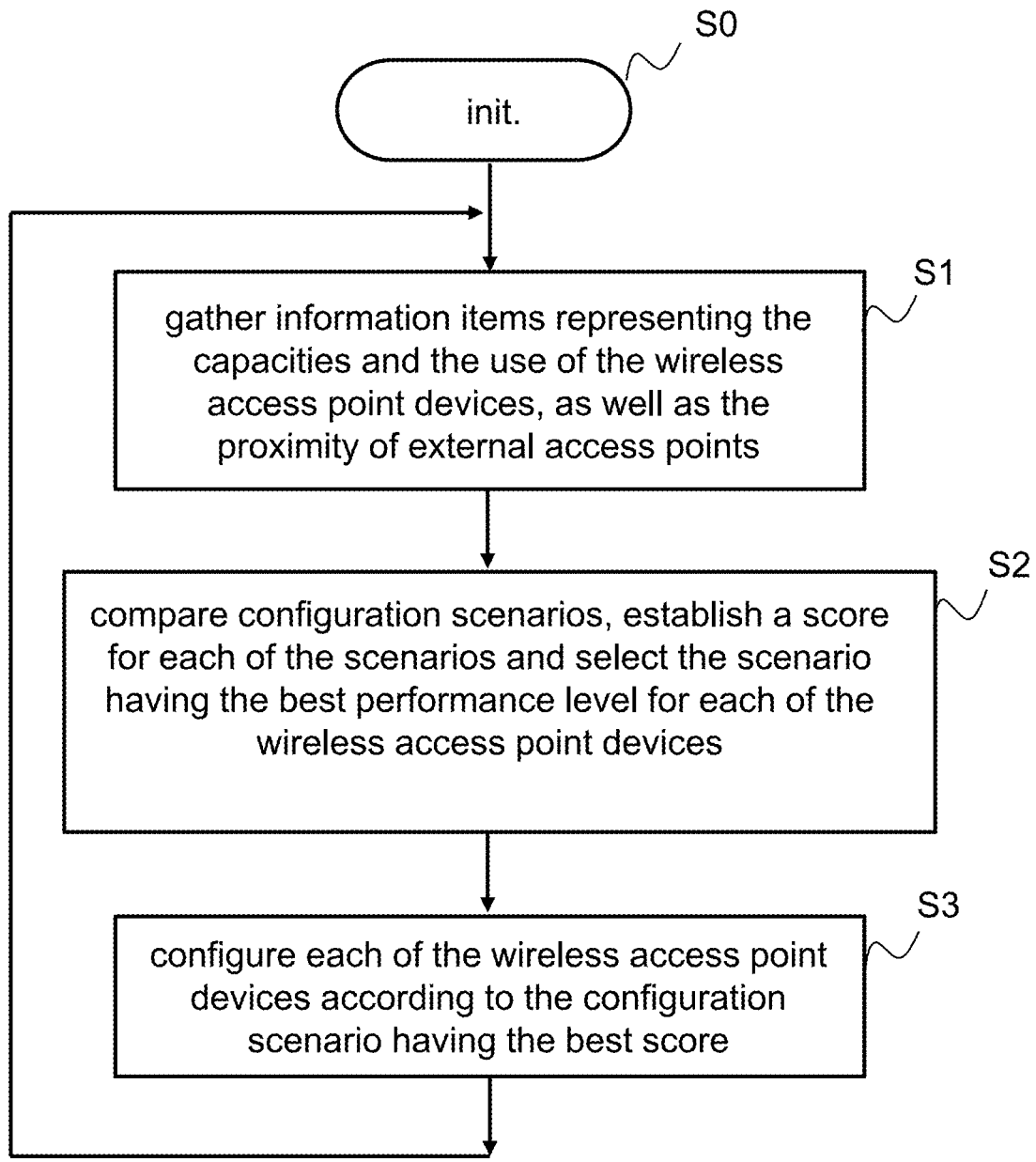
FIG. 3 is a flow chart showing the steps of the method for configuring the plurality of wireless access point devices.

FIG. 3 shows a method for configuring or reconfiguring wireless access point devices according to one embodiment of the invention. A step S0 corresponds to a state in which the electronic devices connected to the local network 1 are operational and configured to nominally interact with each other. In particular, the network gateway 10 is configured so as to allow the various types of electronic devices 121, 141, 142, 181, 182 and 183 to connect to the LAN type local network 1. Furthermore, the network gateway 10 is configured to connect the local network 1 to the wide area network 1000, the configuration device 100, embedded in the network gateway 10 or even in a remote cloud server, is configured to provide optimized configuration services for the various wireless access point devices 11, 12, 14, 16 and 18. Furthermore, the wireless access point devices 11, 12, 14, 16 and 18 are initialized and configured to provide normal services for connecting to the local network 1 and to be able to detect each information item representing the electromagnetic environment in the space surrounding it, within its electromagnetic range. Thus, the step S0 corresponds to the nominal operation of the local network 1 comprising the aforementioned devices and also establishing communications from and to the wide area network 1000 through the network gateway 10. During this step, a method for optimized configuration of the plurality of access point devices 11, 12, 14, 16 and 18 is initiated at the request of a user, an administrator of the local network 1, or even automatically and according to a policy for managing the configuration of the local network 1, and more specifically the configuration of the wireless communications established via the wireless access point devices 11, 12, 14, 16 and 18.

A step S1 immediately follows the initiation of the method for optimized configuration of the wireless access point devices 11, 12, 14, 16 and 18. The aim of this step is to gather information representing the capacities and the use of the wireless access point devices 11, 12, 14, 16 and 18, as well as the proximity of the external wireless access point devices 193, 195 and 197, the presence of which is "visible" (or, to be more exact, perceptible) from any one of at least one of the wireless access point devices 11, 12, 14, 16 and 18. Thus, first information items representing usage capacities of the wireless access point devices are gathered by the configuration device 100. These information items are particularly of the type for knowing the one or more wireless communication standards and protocols supported by each of the wireless access point devices. For example, for a given wireless access point device, this involves being able to determine whether the device can be configured to operate in a 2.4 GHz frequency band and/or in a 5 GHz frequency band, or even whether the wireless access point device supports, for example, the IEEE 802.11a standard, the IEEE 802.11b standard, the IEEE 802.11g standard, the IEEE 802.11n standard, the IEEE 802.11ac standard, the IEEE 802.11ax standard, or any amendment of one of these standards. Depending on the one or more supported standards, it also involves determining which frequency bandwidth possibilities can be used, i.e. whether it is possible to allocate a frequency band (a channel) of the 20 MHz, 40 MHz, 80 MHz or even 160 MHz type, for example, in terms of frequency bandwidth. Of course, the first information items can include other criteria, such as, for example, whether or not it is possible to establish communications in an encrypted form using a determined encryption protocol in order to establish secure wireless communications. More generally, it involves identifying, for each of the wireless access point devices 11, 12, 14, 16 and 18 of the local network 1, any configuration possibility likely to affect the performance capability of the wireless communications established via this device and therefore, as a result, all the communications established in the local network 1. These information items are obtained via protocol exchanges defined according to known interoperability standards between a control unit and a wireless access point device, or even by using exchange capacities between wireless access point devices, if necessary, and always according to such standards.

Other information items, called second information items, are gathered by the configuration device 100 of the network gateway 10, which items are intended to determine the instantaneous or average use of each of the wireless access point devices. Average use is understood herein as use over a predetermined time period, such as, for example, the amount of data that has passed through a given wireless access point device over a period of one day. This involves determining whether a data stream is consistent on one branch of the local network 1, for example, or is less consistent on another branch of the network 1. Thus, it is advantageously possible, for example, to determine whether a wireless access point device of the local network 1 must be preferably configured to operate in a back-haul type sub-network of the local network 1 or in a front-haul type sub-network of the local network 1. A back-haul sub-network is understood herein to be a sub-network for routing data to the front-haul sub-network, with said front-haul sub-network being the sub-network for linking to "client" devices, made up of the access point devices located "at the edge" of the local network 1. Indeed, a back-haul sub-network is comparable to a "data highway", whereas a "front-haul" access point is comparable to an access channel or a smaller route that authorizes less traffic. The second gathered information items are also intended for knowing the type of service that is mainly implemented when data passes through a wireless access point device, either permanently or over a predetermined period. For example, a wireless access point device can be regularly used to transfer data corresponding to an IPTV video stream, such as a Real-Time Streaming Protocol (RTSP) data stream encapsulated in a User Datagram Protocol (UDP) session. Such a service requires more throughput, and therefore more priority, than, for example, a data transfer to a wireless printer used for printing a few documents or pages throughout a day. It is then important, for example, to be able to identify and separate the usual services passing through a wireless access point device, such as services that are respectively and normally called "data", "voice" or even "IPTV" services. The second information items gathered by the configuration device thus allow the use to be known of the electronic devices (also conventionally called stations) connected to all or some of the wireless access point devices 11, 12, 14, 16 and 18 of the local network 1 with respect to the communication capacities allocated thereto. As for the first gathered information items, the second information items are gathered using protocol exchanges defined according to known interoperability standards between a control unit and a wireless access point device, or even by using exchange capacities between wireless access point devices, if necessary, and always according to such standards. Finally, third information items are gathered by the configuration device 100 from the plurality of wireless access point devices 11, 12, 14, 16 and 18, which aim to identify any third-party wireless access point type devices operating within range of one or more of the wireless access point devices of the local network 1, and as a result are likely to interfere with the communications established in the local network 1 and to affect the performance capabilities of these communications. These third-party wireless access point devices are, for example, the wireless access point devices 193, 195 and 197 that are shown in FIG. 1 and FIG. 2 and that are attached to other neighbouring domestic or business networks. The third gathered information items comprise, for example, SSIDs of networks made accessible via these third-party access points, or even BSSIDs associated with these third-party access points, or even information items for determining in which frequency band and with which bandwidth the various detected third-party access points 193, 195 and 197 operate. Of course, the ability to establish communications according to other communication parameters can also be reviewed, and the information items representing the frequency band and the frequency bandwidth are not the only information items determined in association with third-party access points. Here again, the third information items are gathered from the wireless access point devices via protocol exchanges defined according to known interoperability standards between a control unit and a wireless access point device, or even by using exchange capacities between wireless access point devices, if necessary, and always according to such standards. Once these first, second and third information items are gathered, the configuration device 100 can allocate weighting factors to operating or interoperability parameters between wireless access point devices and can determine, for each of the possible configuration scenarios of the plurality of wireless access point devices, a theoretical wireless communications performance score. For example, it is possible to define a high weighting factor with an association of an access point configured with a 160 MHz bandwidth when it is intended to communicate with a station, which is also likely to establish communications with a 160 MHz bandwidth. By contrast, a low weighting factor can be defined when a wireless access point is capable of establishing communications with a 160 MHz bandwidth, but when 90% of the communications established by this wireless access point are used for transmitting information items to a station that can only be configured with a 20 MHz bandwidth.

According to one embodiment, all the assessed scenarios that can be contemplated are scored during a step S2, in order to be compared against predetermined weighting factors. According to an alternative embodiment, and in order to save time and computing power, only meaningful scenarios are assessed, and criteria can be established in order to separate meaningful scenarios from those that make little or no sense. Each of the scenario possibilities is defined by a combination of a choice of a frequency band and a frequency bandwidth for a given wireless access point device of the plurality of wireless access point devices, with the scenarios being considered against predetermined weighting factors.

By way of an example, a first scenario scenario-1 corresponds to the following combinations:
the wireless access point device 11 is configured to operate in the U-NII-2a frequency band with a width of 80 MHz;
the wireless access point device 12 is configured to operate in the U-NII-2a frequency band with a width of 20 MHz;
the wireless access point device 14 is configured to operate in the U-NII-2c frequency band with a width of 40 MHz;
the wireless access point device 16 is configured to operate in the U-NII-2c frequency band with a width of 80 MHz;
the wireless access point device 18 is configured to operate in the U-NII-2a frequency band with a width of 40 MHz.

By way of an example, a second scenario-2 corresponds to the following combinations:
the wireless access point device 11 is configured to operate in the U-NII-2a frequency band with a width of 80 MHz;
the wireless access point device 12 is configured to operate in the U-NII-2a frequency band with a width of 40 MHz;
the wireless access point device 14 is configured to operate in the U-NII-2c frequency band with a width of 40 MHz;
the wireless access point device 16 is configured to operate in the U-NII-2c frequency band with a width of 80 MHz;
the wireless access point device 18 is configured to operate in the U-NII-2a frequency band with a width of 80 MHz.

This means that only the bandwidth parameters of the wireless access point devices 12 and 18 vary between scenario-1 and scenario-2.

The U-NII (Unlicensed National Information Infrastructure) band is a portion of the radio spectrum used by devices and methods that are compatible with the IEEE 802.11 standard, as well as other wireless communication devices. It comprises a plurality of sub-bands called U-NII-1, U-NII-2a, U-NII-2c, U-NII-2e, U-NII-3 and U-NII-4.

By way of an example, a weighting factor for modulating a score of a scenario can be the similarity or a matching level between a choice of a frequency bandwidth, on the one hand, and the maximum configurable frequency band, on the other hand, for each of the wireless access point devices. Another example of a weighting factor for modulating a score of a given scenario is a matching level between a high frequency bandwidth and a type of service from among data transport, voice transport, or video transport. For example, a frequency bandwidth of 160 MHz for an "IPTV" type service results in a high weighting factor, whereas a frequency bandwidth of 160 MHz for occasional "data" type use results in a low weighting factor. According to yet another example, a choice of the same frequency band for two neighbouring wireless access point devices results in a low weighting factor, whereas a choice of separate frequency bands results in a high weighting factor for a given scenario. According to yet another example, a large frequency bandwidth for a wireless access point device with a typically high number of connected stations leads to a high weighting factor, whereas a small frequency bandwidth for a high number of typically connected stations leads to a low weighting factor. These examples are described under the assumption that a higher score due to higher weighting factors corresponds to enhanced communication performance capabilities. Of course, these examples are not limiting and a person skilled in the art will know how to contemplate a good number of predetermined weighting factors or even factors that can be modulated as a function of time and of the development of the architecture of a local network comprising a configuration device, such as the configuration device 100 implementing the method according to the embodiments. The key is to be able to establish scores that are meaningful with respect to performance criteria and to be able to distinguish between all the possible scenarios, or even between all the scenarios considered insofar as their respective assessments make sense.

According to one embodiment, for each of the combinations of frequency band and frequency bandwidth choices, optional more detailed scenarios (or sub-scenarios) intended to consider a choice of a primary channel and secondary channel or channels are not analyzed. Thus, and for a given wireless access point device in a given scenario, a combination of a frequency band and frequency bandwidth selection is only considered after determining a primary channel offering the highest level of performance for this given access point device in this given scenario, with respect to the respective configurations of the other wireless access point devices of the local network 1, according to this scenario, and in particular with respect to the selected primary channel, and the secondary channel or channels that result from the selection of a primary channel.

Thus, for a device offering frequency bandwidth configuration possibilities that are greater than the width of an "elementary" 20 MHz channel, a choice of primary channel and one or more secondary channels is made when selecting a channel. It is known that two neighbouring wireless access point devices, each positioned in an environment within electromagnetic range of the other, will have much better communication performance capabilities if they have made a common primary channel selection. Indeed, two neighbouring wireless access point devices can communicate with each other by means of a common primary channel in order to optimize the communications established by each of them. This possibility does not exist when they operate in the same frequency band but have selected separate primary channels.

According to an alternative embodiment of the embodiment, each of the contemplated scenarios corresponds not only to a choice of frequency band and frequency bandwidth, but also to a combination of these two features (or parameters), plus the choice of a primary channel, if applicable. However, this alternative embodiment requires additional computation resources, unless a longer processing time is contemplated for the selection of an optimized configuration scenario by the configuration device 100.

Finally, after determining the best configuration scenario score, the wireless access point devices are each configured during a step S3 in accordance with the configuration parameters established according to the scenario with this best score. According to one embodiment, the most efficient scenario has the highest score. According to an alternative embodiment, the lowest score corresponds to the most efficient scenario.

An example of a weighting factor allowing varying scores to be achieved for and according to considered scenarios is, for example, a priority level $AP_{PRIORITY}$ defined in terms of communication capacities, that is, in other words, a passband level to be allocated to a wireless access point device for establishing communications. Such a prioritization factor $AP_{PRIORITY}$ can be defined, for example, for each of the wireless access point devices 11, 12, 14, 16 and 18, on the basis of three different parameters, which are: a traffic level $AP_{TRAFFIC}$ observed through a wireless access point device, a main service type $AP_{SERVICE}$ from among data, voice and video, as well as an average level of maximum performance $AP_{STA}$ of the stations connected to this wireless access point device.

With respect to the $AP_{TRAFFIC}$ factor, it is possible to compute, for example, a median average, for the last 24 hours, of an occupancy rate per hour of the physical media associated with the radio configuration parameters that are used.

With respect to the $AP_{SERVICE}$ factor, a service preference coefficient can be allocated to each of the defined service types. For example, a data service can be associated with a coefficient of 1, a voice transport type service can be associated with a coefficient of 2, and a video transport type service can be associated with a coefficient of 3, and a backhaul type service (routing of any type of data to a fronthaul) can be associated with a coefficient of 4.

With respect to the $AP_{STA}$ factor, it allows preference to be given, for example, to access point devices connected to stations compatible with an IEEE 802.11ac communication standard in relation to wireless access point devices connected to stations compatible with an IEEE 802.11n communication standard or even an IEEE 802.11b communication standard. To this end, it is possible to compute, for example, a double median average over the last 24 hours of the types of connected stations by applying a preference coefficient that is defined so that the coefficient is equal to 1 for a station of the IEEE 802.11b type, equal to 2 for a station of the IEEE 802.11n type, equal to 3 for a station of the IEEE 802.11ac type and equal to 4 for a station of the IEEE 802.11ax type. Finally, it is possible to establish an $AP_{PRIORITY}$ weighting factor representing a priority level to be allocated in terms of bandwidth as a function of the three factors $AP_{TRAFFIC}$, $AP_{SERVICE}$ and $AP_{STA}$, by weighting them, for example, with respective coefficients $C_{TRAFFIC}$, $C_{SERVICE}$ and $C_{STA}$, such that the priority level of each of the wireless access point devices ranges between 0 and a maximum value (for example, 1) and such that each of the $AP_{TRAFFIC}$, $AP_{SERVICE}$ and $AP_{STA}$ factors represents a percentage of the final factor $AP_{PRIORITY}$.

Finally, a scenario performance score is determined on the basis of predetermined criteria and defined weighting factors.

Figure 6:
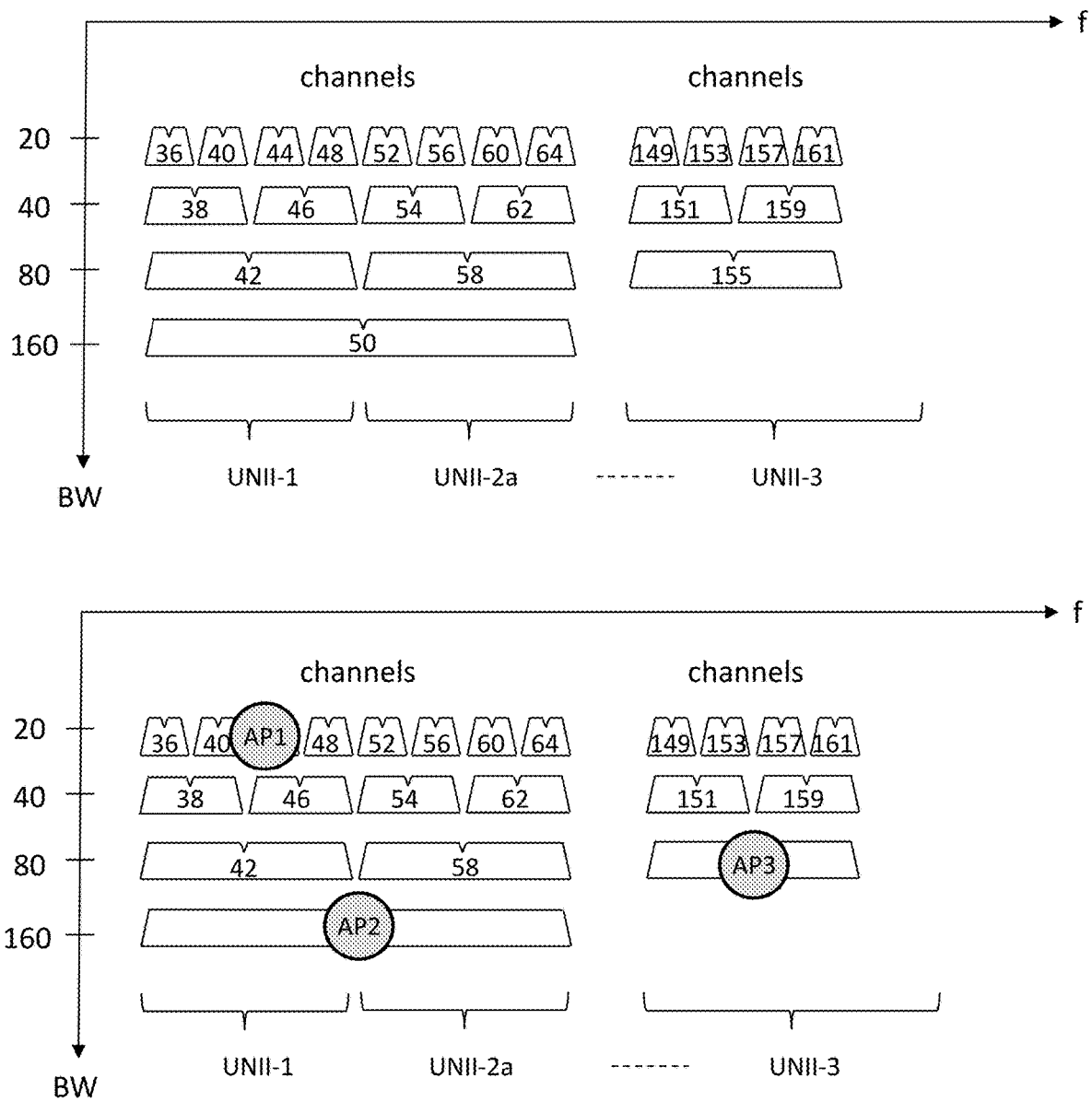
FIG. 6 is an illustration of a frequency space (physical medium) that can be used by the wireless access point devices of the network shown in FIG. 1, configured according to a first example of a configuration scenario.

FIG. 6 is intended to facilitate the understanding of the definition of all the possible configuration scenarios for the plurality of wireless access point devices in a predetermined frequency space, and considering that each of the scenarios corresponds to a configuration of each of the wireless access point devices of the local network 1 according to a combination of a selected frequency band (channel) and a selected frequency bandwidth. Thus, the upper part of FIG. 6 shows a frequency space comprising four successive frequency bands UNII-1, UNII-2a and UNII-3 (sometimes called "sub-bands"). The frequency space shown in this figure is deliberately limited in order to simplify the present description of the scenarios to be considered. The abscissa axis represents the frequency bands (or channels) over which communications can be established by virtue of the wireless access point devices 11, 12, 14, 16 and 18, as well as the third-party wireless access point devices 193, 195 and 197. The ordinate axis represents an increasing frequency bandwidth broken down into 4 discrete values of 20 MHz, 40 MHz, 80 MHz and 160 MHz, also called channel width.

"Elementary" communication frequency bands are defined for a frequency bandwidth of 20 Mhz. These frequency bands are respectively called channel 36, channel 40, channel 44 and channel 48 in the UNII-1 frequency band, then channel 52, channel 56, channel 60 and channel 64 in the UNII-2a frequency band, channel 149, channel 153, channel 157 and channel 161 in the UNII-3 frequency band.

In a configuration where the frequency bandwidth is equal to 40 MHz, the frequency bands are respectively called channel 38 and channel 46, in the UNII-1 frequency band, then channel 54 and channel 62 in the UNII-2a frequency band, channel 151 and channel 159 in the UNII-3 frequency band, and so on, ending with the frequency band called channel 50 for the UNII-1 and UNII-2a frequency bands. Of course, the frequency bands shown in FIG. 6 are not the only ones that can be used and are used in the various embodiments, with the representation of the frequency bands chosen in this case, in FIG. 6, being deliberately limited for the sake of the readability of FIG. 6. It can be noted that each frequency band is denoted according to the channel corresponding to its central frequency as defined on the frequency axis (on the abscissa). Thus, each combination of frequency band and frequency bandwidth selected for a given access point device amounts to configuring this device to establish communications in one of the frequency bands (channels), as previously identified and defined (channel 36, channel 40, channel 44, . . . channel 38, channel 46, channel 54, . . . channel 42, channel 58, channel 155, channel 50). The method according to the invention is not limited to only the frequency bands mentioned above, but applies to any frequency space compatible with the configuration and operation possibilities of wireless access point devices. The lower part of FIG. 6 therefore shows a configuration scenario applied to three wireless access point devices AP1, AP2 and AP3. The positioning of a circle symbolizing an access point device corresponds to a combination of a frequency band selection and a frequency bandwidth selection. Thus, according to the example described in the lower part of FIG. 6, the wireless access point device AP1 operates in frequency band 44 (or channel 44), with a bandwidth of 20 MHz; the wireless access point device AP2 operates in frequency band 50 (or channel 50), with a bandwidth of 160 MHz; and the wireless access point device AP3 operates in frequency band 155 (or channel 155), with a bandwidth of 80 MHz.

Figure 7:
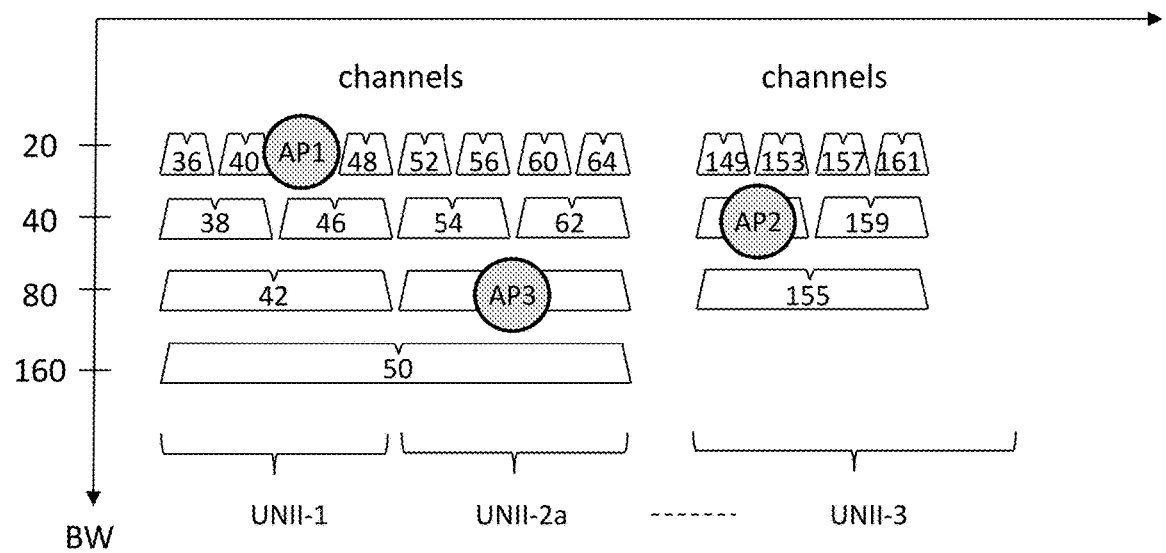
FIG. 7 is a second example of a configuration scenario for wireless access point devices of the network shown in FIG. 1.

According to a second example of a scenario described in FIG. 7, the wireless access point device AP1 operates in frequency band 44 (or channel 44), with a bandwidth of 20 MHz; the wireless access point device AP2 operates in frequency band 151 (or channel 151), with a bandwidth of 40 MHz; and the wireless access point device AP3 operates in frequency band 58 (or channel 58), with a bandwidth of 80 MHz.

Figure 8:
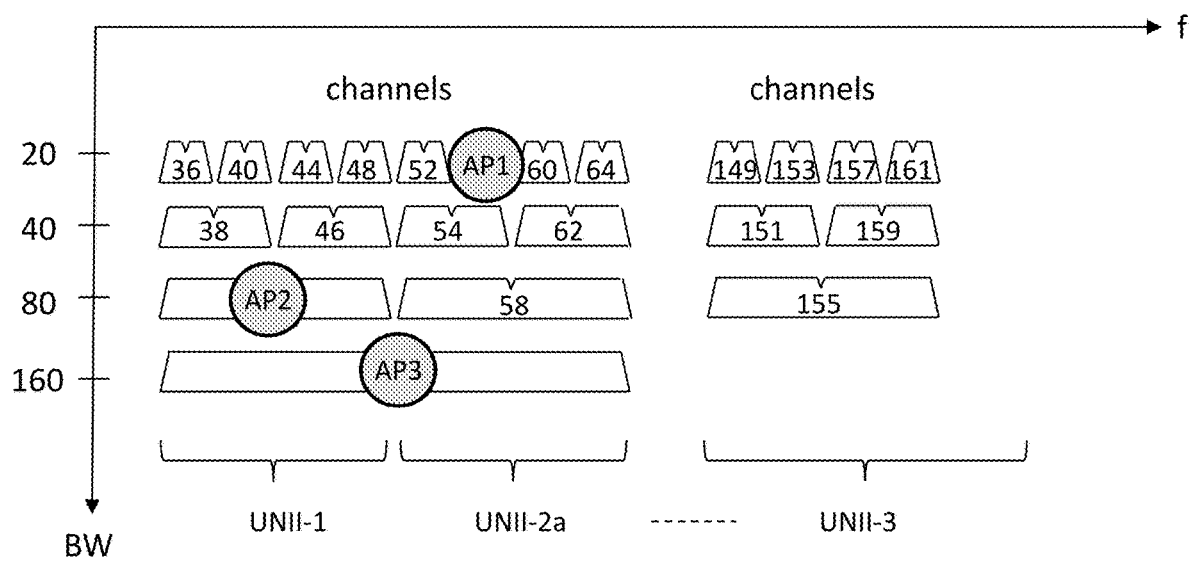
FIG. 8 is a third example of a configuration scenario for wireless access point devices of the network shown in FIG. 1.

Finally, according to a third example of a scenario described in FIG. 8, the wireless access point device AP1 operates in frequency band 56 (or channel 56), with a bandwidth of 20 MHz; the wireless access point device AP2 operates in frequency band 42 (or channel 42), with a bandwidth of 80 MHz; and the wireless access point device AP3 operates in frequency band 50 (or channel 50), with a bandwidth of 160 MHz.

Thus, and according to a similar principle, considering all the possible configuration scenarios for the wireless access point devices 11, 12, 14, 16 and 18 of the local network 1 amounts to "traversing" all the possible combinations of a configurable frequency band and a configurable frequency bandwidth of the plurality of wireless access point devices 11, 12, 14, 16 and 18.

Again, by the same reasoning, considering all the meaningful configuration scenarios for the wireless access point devices 11, 12, 14, 16 and 18 of the local network 1 amounts to "traversing" all the combinations of a frequency band and a frequency bandwidth of the plurality of wireless access point devices 11, 12, 14, 16 and 18 that do not have a major disadvantage in terms of configuration, considered to be prohibitive, and excluded from the scenarios to be compared. Such an excluded scenario is, for example, a scenario that does not meet predetermined criteria, such as, for example, two neighbouring wireless access point devices within range of each other that do not share the same primary channel when sharing the same primary channel can be contemplated.

Figure 4:
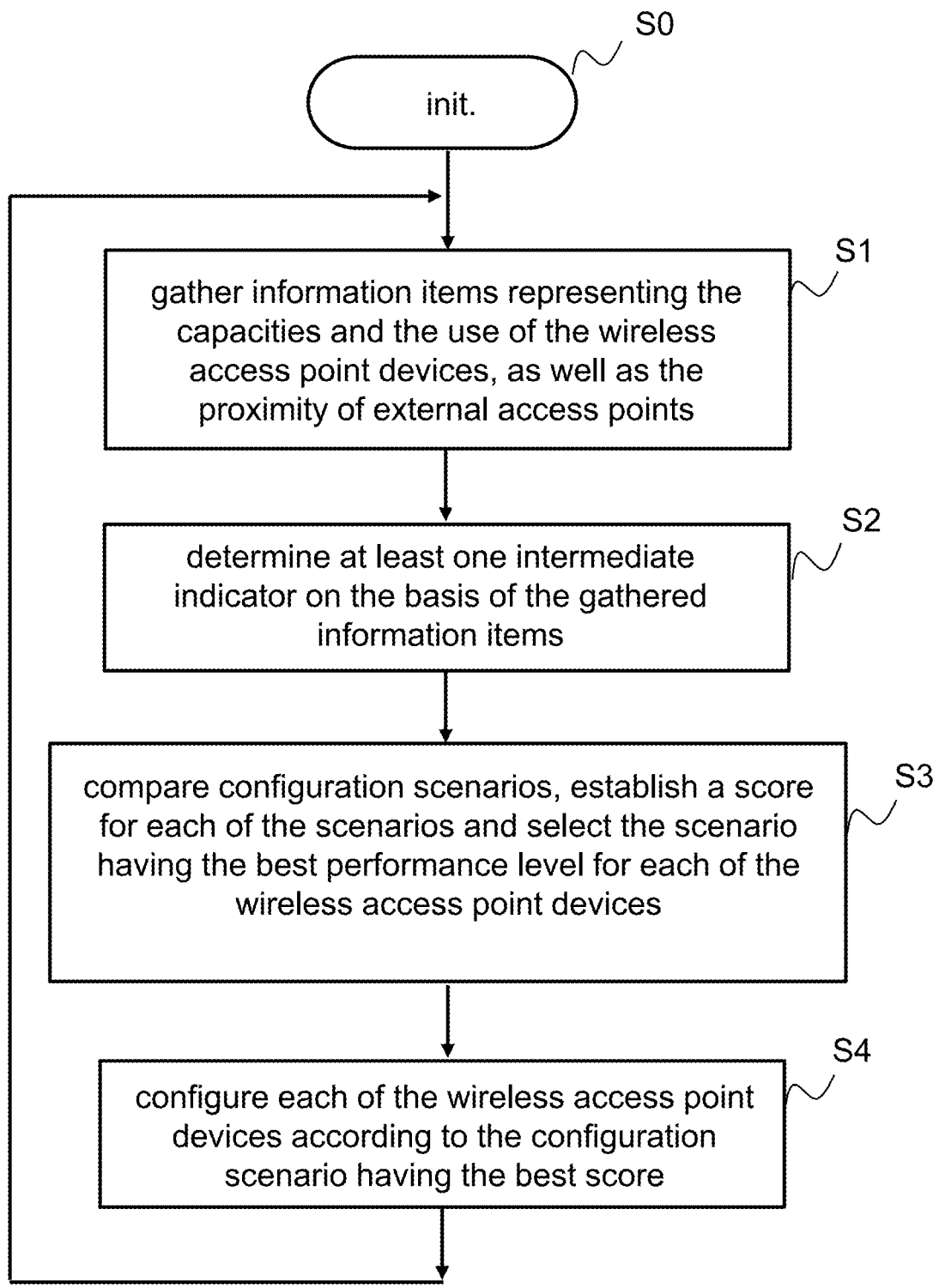
FIG. 4 is a flow chart showing an alternative embodiment of the configuration method already shown in FIG. 3.

FIG. 4 shows a method for configuring wireless access point devices according to another embodiment of the invention involving computing a weighting factor $AP_{PRIORITY}$ representing a priority level to be allocated in terms of pass-band and to be used as an intermediate indicator optionally coupled to one or more other intermediate indicators. According to this embodiment, the initialization step S0 and the step S1 of gathering first, second and third information items are similar to those already described in relation to the method shown in FIG. 3.

According to a preferred embodiment, three intermediate indicators are defined during a step S2, prior to the allocation of a score for a given scenario. These intermediate indicators are a weighting factor $AP_{PRIORITY}$ representing a priority level to be allocated in terms of pass-band to each of the wireless access points 11, 12, 14, 16 and 18, established as previously described, an occupancy indicator for each of the elementary channels and for a given scenario established by means of a comparison table CT for elementary channel occupancy, as well as an elementary channel preference indicator intended to distinguish elementary channels having the same theoretical occupancy rate according to a given scenario. According to one embodiment, a channel preference indicator is predefined for each of the elementary channels of the usable frequency space, in an empirical or arbitrary manner, based both on technical considerations and on uses predominantly observed in terms of channel allocation. FIG. 9 shows a comparison table CT for elementary channel occupancy for each of the possible configuration scenarios of the plurality of wireless access point devices, also taking into account the detected configuration of the third-party wireless access point devices 193, 195 and 197. The comparison table CT for elementary channel occupancy comprises, for example, a first column entitled "CHAN", which comprises identifiers 1 to 24 of elementary frequency bands (channels) that can be allocated in the defined frequency space that forms the "physical medium" of the established wireless communications. A second column entitled "CHAN.CHANNEL" comprises identifiers of elementary frequency bands (channels) defined with respect to central frequencies. Thus, the frequency bands shown in FIG. 6 for a frequency bandwidth of 20 MHz are included in this second column. A third column entitled "CHAN. BAND" includes a frequency band (or sub-band) identifier as normatively defined and that allows, for example, the sub-bands UNII-1, UNII-2a, UNII 2c, UNII-3 to be distinguished. According to the example described, the sub-band UNII-2b is not shown since it is not used. Fourth, fifth and sixth columns entitled "CHAN.160 MHz", "CHAN.80 MHz" and "CHAN.40 MHz" include frequency band identifiers that can be allocated as a function of the selected frequency bandwidth. Thus, for a frequency bandwidth of 160 MHz, two complete sub-bands can be selected by the wireless access point devices, while for a frequency bandwidth of 80 MHz, six complete sub-bands can be selected by the wireless access point devices, and, finally, for a frequency bandwidth of 40 MHz, twelve complete sub-bands can be selected by the wireless access point devices (from 1 to C in hexadecimal). It should be noted that the sub-band identified by the value "0" in the configuration (column "CHAN.160 MHz") comprising a frequency bandwidth equal to 160 MHz means that this sub-band cannot be used in this configuration, since it does not have a sufficient width of 160 MHz. For this reason, only two sub-bands can be used with a frequency bandwidth of 160 MHz. A seventh column includes the predefined channel preference indicators for each of the elementary channels, intended to distinguish between two elementary channels when computed theoretical occupancy rates are identical for two elementary channels.

The examples of theoretical occupancy rate values provided in the comparison table CT in FIG. 9 correspond to a detected presence of third-party access point devices within range of the local network 1, configured as follows:
  a first third-party access point operates on channel 36, with a frequency bandwidth of 80 MHz;
  a second third-party access point operates on channel 36, with a frequency bandwidth of 160 MHz;
  a third third-party access point operates on channel 104, with a frequency bandwidth of 80 MHz; and
  a fourth third-party access point operates on channel 157, with a frequency bandwidth of 40 MHz.

Ingeniously, during a step S3, the comparison of each of the configuration scenarios to be considered amounts to superimposing each of the configurations of the wireless access point devices 11, 12, 14, 16 and 18, as well as each of the detected configurations of the wireless access point devices 193, 195 and 197, and then defining a theoretical occupancy rate per elementary frequency band (channel) for each of the scenarios. To this end, for example, various occupancy weightings are conventionally defined depending on whether or not two access point devices share the same primary channel. For example, an occupancy factor of 1 can be conventionally and empirically defined for a channel selected as being the primary channel and an occupancy factor of 10 can be defined for a channel selected as being the or a secondary channel, since a channel occupied by a secondary channel is less efficient than a channel occupied by a primary channel.

Still in step S3, and once the theoretical occupancy rates have been determined for each of the elementary frequency bands (or elementary channels), a scenario performance score can be computed.

For example, a scenario performance score can be established for each of the considered scenarios by adding the sum of the n ratios thus defined for the n wireless access point devices of the local network 1:
($AP_{PRIORITY}$×maximum theoretical channel throughput as a function of the maximum MCS that can be used by the wireless access point device, the maximum number of data streams that can be used by the wireless access point and the frequency bandwidth configured for the considered scenario)/sum of the theoretical occupancy rates computed for the elementary channels used by the wireless access point device. The term MCS (Modulation and Coding Scheme) herein refers to a modulation and coding scheme used by a wireless access point device.

According to the example described, five terms are then added together to obtain the score of a scenario since there are five wireless access point devices 11, 12, 14, 16 and 18.

During a step S4, the configuration device 100 proceeds to configure all the wireless access point devices of the local network 1 in accordance with the scenario with the best score.

Advantageously, the optimized configuration method can be executed recurrently, for example, once a day or even when a device is detected as being added to or removed from the local network or each time a third-party device appears or disappears from the range of at least one of the wireless access point devices of the local network 1.

Ingeniously, and depending on the number of elementary frequency bands to be considered, a method can be defined that is implemented so that this method comprises a path index for a plurality of scenarios using a hexadecimal coding comprising, for each of the access point devices of the local network 1, a frequency band path sub-index and a frequency bandwidth path sub-index, so that the path of a plurality of scenarios to be considered and to be compared can be implemented by incrementing this index by one unit.

The terms frequency bandwidth path sub-index and frequency bandwidth path sub-index in this case respectively denote indices used to traverse all the possible usable frequency band configurations (channel 36, . . . channel 163) and all the possible usable frequency bandwidth configurations (20, 40, 80 and 160 MHz). The benefit of such an implementation using such an index is that this form of index limitlessly adapts to the number of access point devices present in the system. Thus, each access point device is represented by a number made up of two hexadecimal elements, a first element of which corresponds to the bandwidth path sub-index and a second element of which corresponds to the frequency band path sub-index. The ingenious use of hexadecimal elements thus makes it possible to code, with only 1 element (digit or letter), the sub-indices according to sixteen separate values instead of ten as a basis 10. This appears to be particularly advantageous in the context of the overall band called the 5 GHz band, which comprises twelve frequency bands for a bandwidth configuration of 40 MHz. Thus, the path index can denote all the successive configurations of a set of wireless access point devices when the first two elements of the index correspond to a first wireless access point device, the third and fourth elements of the index correspond to a second wireless access point device, and so on.

Figure 5:
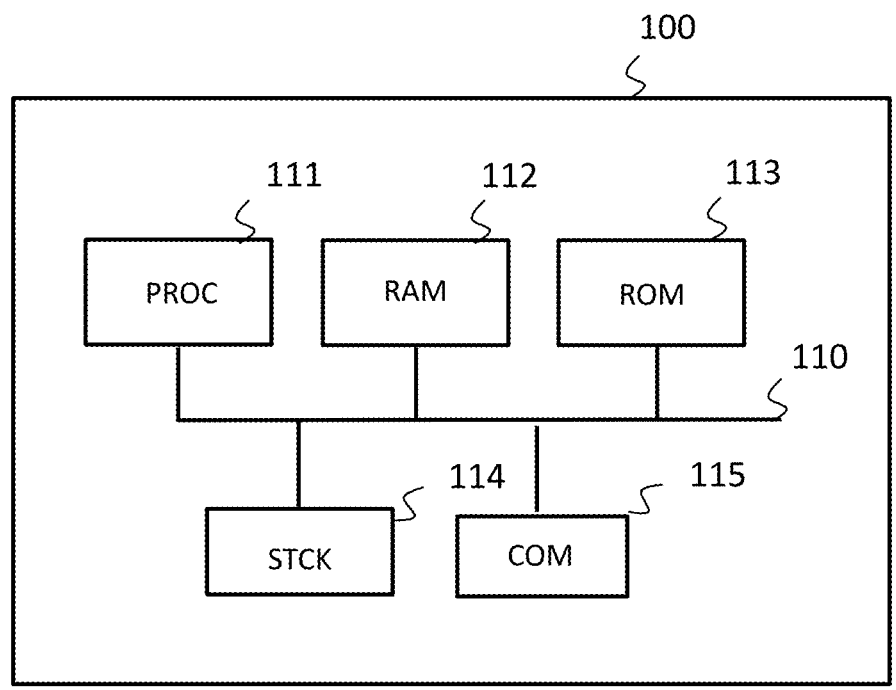
FIG. 5 is a principle diagram showing an internal architecture of a configuration device for executing a method for configuring a plurality of wireless access point devices, as shown in FIG. 3 and FIG. 4, according to one embodiment.

FIG. 5 schematically shows an example of the internal architecture of the configuration device 100, also commonly called "Master" 100. It should be noted that FIG. 5 could also schematically show an example of the hardware architecture of the digital core of the network gateway 10 comprising the configuration device 100, or even an example of the hardware architecture of a wireless access point device from among the devices 11, 12, 14, 16 and 18, or an example of the architecture of a station connected to a wireless access point.

According to the example of the hardware architecture shown in FIG. 5, the configuration device 100 then comprises, connected by a communication bus 110: a processor or CPU ("Central Processing Unit") 111; a RAM ("Random Access Memory") 112; a ROM ("Read Only Memory") 113; a storage unit such as a hard disk (or a storage medium reader, such as an SD ("Secure Digital") card reader) 114; at least one communication interface 115 allowing the configuration device 100 to communicate with devices present in the communication network 1, such as, for example, the wireless access point devices 11, 12, 14, 16 and 18.

The processor 111 is capable of executing instructions loaded into the RAM 112 from the ROM 113, an external memory (not shown), a storage medium (such as an SD card), or a communication network. When the configuration device 100 is powered on, the processor 111 is able to read instructions from the RAM 112 and to execute them. These instructions form a computer program causing the processor 111 to implement part of a method described with reference to FIG. 3 and FIG. 4.

All or part of the method implemented by the configuration device 100, or the alternative embodiments thereof as described, can be implemented in software form by executing a set of instructions using a programmable machine, for example, a DSP (Digital Signal Processor) or a microcontroller, or can be implemented in hardware form by a dedicated machine or component, for example, an FPGA (Field-Programmable Gate Array) or an ASIC (Application-Specific Integrated Circuit). In general, the configuration device 100 comprises electronic circuitry configured to implement the method described in relation to itself, as well as to the wireless access point devices 11, 12, 14, 16 and 18, and any other device involved in executing the described configuration method. Of course, the configuration device 100 further comprises all the elements commonly present in a system comprising a control unit and its peripherals, such as, a power supply circuit, a power supply monitoring circuit, one or more clock circuits, a reset circuit, input-output ports, interruption inputs, bus drivers. This list is not exhaustive.

Figure 10:
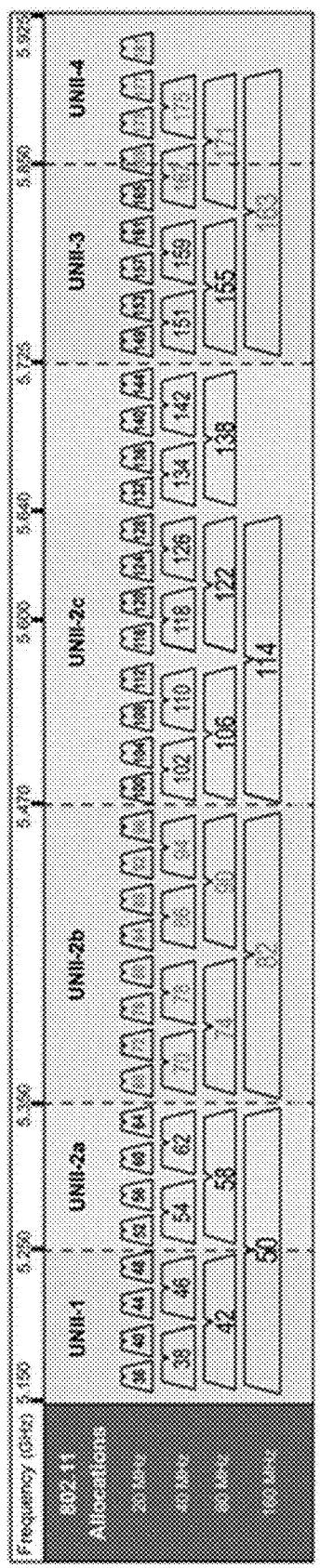
FIG. 10 is an illustration of the frequency band, called "5 GHz band", for which channels can be used for wireless communications according to the embodiments.

FIG. 10 shows the set of sub-bands (or frequency bands) included in the frequency band called the "5 GHz band" that can be used for wireless communications. The frequency band (or channel) identifiers that appear in grey (UNII-2b band, UNII-4 band and some channels of the UNII-3 band) indicate channels that are not used (due to restrictions or provisions). According to another embodiment, the frequency band called the "2.4 GHz" band is used. According to yet another embodiment, both the "2.4 GHz" and "5 GHz" frequency bands are used.

The invention is not limited solely to the embodiments and examples previously described, but more generally relates to any method for optimized configuration of a plurality of wireless access point devices of a local network or in a plurality of local networks comprising gathering first information items representing usage capacities of the wireless access point devices, gathering second information items representing the use or usage capacities of electronic devices connected to one or more of the wireless access point devices, gathering third information items representing a use, by at least one wireless access point device outside the communication network, of a communication frequency band (a channel) that can be used by at least one of the wireless access point devices, then considering a plurality of configuration scenarios each corresponding to at least one combination of a frequency band and a frequency bandwidth and establishing a theoretical performance score for each of the considered scenarios, established at least with respect to said first, second and third information items, and finally configuring the wireless access point devices in accordance with the configuration scenario with the best performance score.

The invention claimed is:

1. A method for configuring a plurality of wireless access point devices, executed by a configuration device, in a communication network, the method comprising a plurality of steps comprising:
   gathering first information items, representing communication capacities of the wireless access point devices, determining the one or more wireless communication standards and protocols supported by each of the wireless access point devices from among said plurality of wireless access point devices, and the possibilities of frequency bands and of frequency bandwidth that can be used by these devices;
   gathering second information items, representing the use or the usage capacities of the electronic devices connected to all or some of the wireless access point devices with respect to the communication capacities allocated thereto;
   gathering third information items representing a use, by at least one wireless access point device outside the communication network, operating within range of the one or more wireless access point devices of the communication network, of a communication channel that can be used by at least one of the wireless access point devices of said plurality of wireless access point devices;
   considering a plurality of configuration scenarios, with each of the configuration scenarios corresponding to a selection, for each of the wireless access point devices, of a combination of a frequency band and of a frequency bandwidth;
   establishing a theoretical score representing communications performance for each of said considered configuration scenarios, with the score being established at least with respect to said first, second and third information items, as a function of predetermined criteria; and
   configuring the wireless access point devices of the plurality of wireless access point devices in accordance with the configuration scenario having the best communications performance score.

2. The configuration method according to claim 1, further comprising:
   determining, for each of the wireless access point devices of the plurality of wireless access point devices, one or more intermediate indicators on the basis of all or some of the first, second and third gathered information items, and wherein establishing the theoretical communications performance score for each of said considered configuration scenarios takes into account at least one intermediate indicator.

3. The configuration method according to claim 2, wherein the one or more first intermediate indicators is/are included in the following list: a communication channel preference index, a communication channel occupancy rate, and a priority index of the use of a wireless access point device.

4. The configuration method according to claim 3, wherein considering the plurality of scenarios involves selecting a communication channel that involves selecting a primary communication channel having the highest preference index from among a plurality of channels having the lowest occupancy rate.

5. The configuration method according to claim 4, wherein the establishing a theoretical score comprises determining a theoretical occupancy rate which is defined using different weightings whether or not two wireless access point devices within range of each other may or may not share the same primary communication channel.

6. A non-transitory information storage medium embodying a computer program product, wherein the computer program product comprises program code instructions for executing the steps of the method according to claim 1, when said program code instructions are executed by a processor of a configuration device.

7. The non-transitory information storage medium according to claim 6, wherein the method comprises a path index of a plurality of scenarios, which index uses hexadecimal coding of a number of traversed communication channels.

8. A device for configuring a plurality of wireless access point devices, in a communication network, the device comprising:
    an electronic circuitry configured for gathering first information items representing communication capacities of the wireless access point devices determining the one or more wireless communication standards and protocols supported by each of the wireless access point devices from among said plurality of wireless access point devices, and the possibilities of frequency bands and of frequency bandwidth that can be used by these devices;
    gathering second information items representing the use of the electronic devices connected to all or some of the wireless access point devices with respect to the communication capacities allocated thereto;
    gathering third information items representing a use, by at least one wireless access point device outside the communication network, operating within range of the one or more wireless access point devices of the communication network, of a communication channel that can be used by at least one of the wireless access point devices of said plurality of wireless access point devices;
    comparing a plurality of configuration scenarios, with each of the configuration scenarios corresponding to a selection, for each of the wireless access point devices, of a combination of a frequency band and of a frequency bandwidth;
    establishing a theoretical score representing communications performance for each of said considered configuration scenarios, with the score being established at least with respect to said first, second and third information items, as a function of predetermined criteria; and
    configuring the wireless access point devices of the plurality of wireless access point devices in accordance with its configuration scenario having the best communications performance score.

9. A network gateway type communication equipment or server comprising the device according to claim 8.

* * * * *